Oct. 20, 1953     N. H. MARSH     2,656,252
PRODUCTION OF AMMONIUM NITRILOTRISULFATE
Filed June 2, 1951
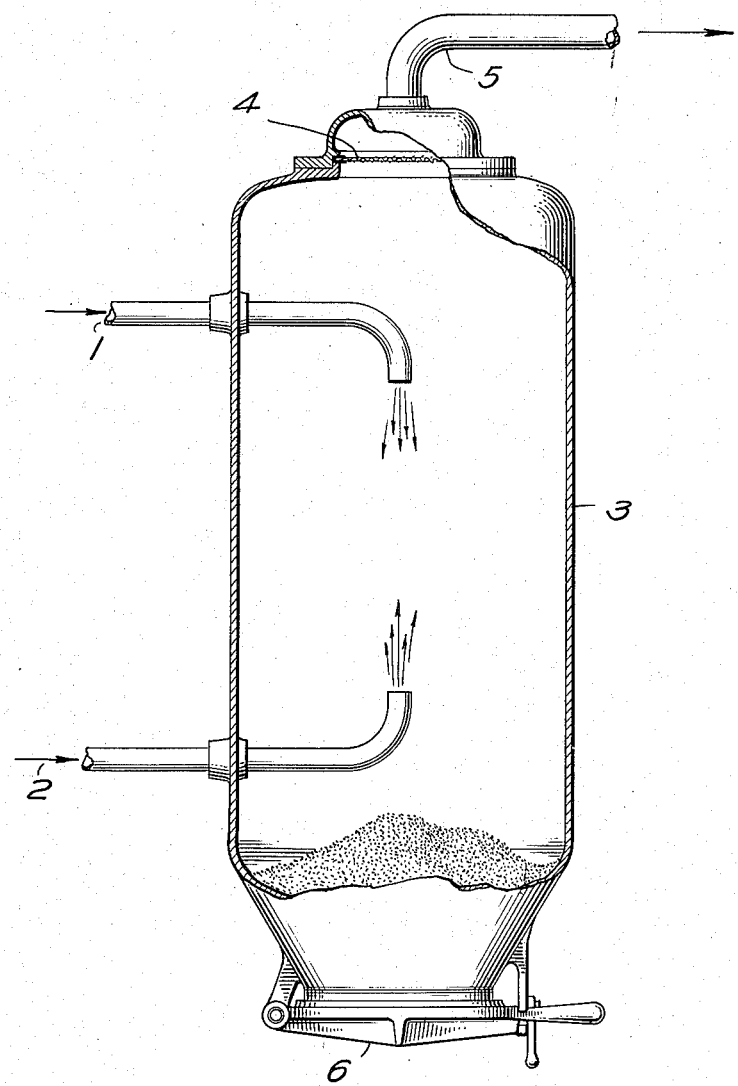
INVENTOR
NAT H. MARSH,
BY Charles L. Harness
ATTORNEY Patented Oct. 20, 1953

2,656,252

UNITED STATES PATENT OFFICE 2,656,252

PRODUCTION OF AMMONIUM NITRILO-TRISULFATE

Nat H. Marsh, Noroton Heights, Conn., assignor to American Cyanamid Company, New York, N. Y., a corporation of Maine Application June 2, 1951, Serial No. 229,559

6 Claims. (Cl. 23—190)

1

The present invention relates to a new compound, ammonium nitrilotrisulfate, $N(SO_3NH_4)_3$, heretofore unknown in its anhydrous state, and to a method for its preparation. It is an object of the invention to prepare this compound by the reaction of inexpensive raw materials. It is a further object of the invention to react sulfur trioxide and ammonia under novel conditions. Additional objects will be apparent from the discussion hereinafter.

The figure shown in the drawing represents a simple reactor in which the reaction can be carried out.

Heretofore the only known method of preparing an ammonium nitrilosulfate has been in the wet way, such as by subjecting a concentrated solution of ammonium nitrite to the action of sulfur dioxide and ammonia until a dihydrate of ammonium nitrilosulfate is precipitated. This method is discussed by Divers and Haga in Journal of the Chemical Society, Transactions, volume 79, page 1093 (1901). In the article it was stated that the anhydrous compound could not be obtained by the reaction of ammonia with sulfur trioxide. Despite this teaching of the art, however, it has now been found that ammonium nitrilosulfate can be made by reacting ammonia and sulfur trioxide under certain critical conditions, as described hereinafter.

It is old in the art to react ammonia and sulfur trioxide in the vapor phase to prepare sulfamide, ammonium sulfamate, or ammonium imidosulfate, either using the pure reactants or by admixing them with an inert diluent gas such as air. However, no one has ever before reacted ammonia and sulfur trioxide with a diluent in the $NH_3:SO_3$:diluent ratio necessary to form ammonium nitrilo trisulfate (hereinafter also called "nitrilo"). Always in the past, when a gaseous diluent was used, the $NH_3:SO_3$ ratio was such that no "nitrilo" was formed; or else, when the $NH_3:SO_3$ ratio was correct for nitrilo formation, the diluent was omitted, resulting in the formation of products other than the nitrilo compound. For example, German Patent No. 562,738 shows that a volume ratio, $NH_3SO_3$ of 1.76:1 using no inert diluent gas gives 100% pure ammonium imidosulfate. Actually this ratio will give nitrilo if sufficient diluent is present, as described hereinafter.

In practicing the invention to obtain high yields of ammonium nitrilosulfate it is necessary to use a considerable amount of an inert diluent gas such as air, nitrogen, or the like, and it is further preferred for economic consideration and

2 ease of handling, to introduce the inert diluent gas along with the $SO_3$. A pre-diluted $SO_3$ is available in industry, namely $SO_3$ converter gas produced in a contact sulfuric acid plant, and such converter gas is satisfactory for the operation of the invention. Contact converter gas varies between 7 and 12% $SO_3$ by volume, the remainder being spent air.

The following examples illustrate without limiting the invention.

Example 1

Into a reactor such as that represented in the figure of the drawing there is passed over a period of 2 hours and 50 minutes, 10 mols of $SO_3$ as an 8 volume percent concentration in commercial sulfur trioxide converter gas, and 15.2 mols of anhydrous ammonia, in a volume ratio of $$NH_3:SO_3:air = 11:7:82$$

At the end of the reaction period, the reactor was opened and there was recovered 1,044 g. of produce. During the reaction 0.84 mol of ammonia left the reactor. The product obtained was analyzed and found to consist of pure ammonium nitrilosulfate containing 1.7% of adsorbed ammonia. This example incorporates the preferred conditions for making ammonium nitrilosulfate by the process of this invention.

Numerous variations in the illustrated process will occur to those skilled in the art. For example, the residence time of the reactants may be varied widely. (A residence time of a few seconds will give some nitrilo.) The reactants of this example were introduced at room temperature and atmospheric pressure, but other temperatures and pressures can be used, as described elsewhere in this specification.

Example 2

It is not necessary to introduce the inert diluent gas with the $SO_3$. All of the diluent can be introduced with the $NH_3$, or some with the $SO_3$ and some with the $NH_3$. In one run analogous to Example 1, an 8% concentration of $SO_3$ in air and a 50% concentration of $NH_3$ in air was used, the volume ratio of $SO_3:NH_3$:air being 6:11.9:82.1, with 39% of the $SO_3$ used going to the desired nitrilo compound.

It is preferred to operate the process with a relatively great excess of inert diluent gas, e. g., in the diluent:$SO_3$ volume ratio of 3–100:1 (or even greater) and still more preferably, at 7–12:1. A small amount of nitrilo is obtained, however, at diluent:$SO_3$ volume ratios as low as 0.5:1. However, the process becomes increasingly difficult to operate with decreasing amounts of diluent and furthermore the yield of nitrilo apparently decreases qualitatively with a decrease in the amount of diluent. It is known (German Patent 562,738) that when a diluent is completely absent (except for the small amount of air initially present in the reactor) the product is pure ammonium imidosulfate.

The $NH_3:SO_3$ volume ratio is critical in that it must be at least 1.33. Slightly lower ratios (e. g., 1.3) give a gummy product of indeterminate composition. The $NH_3:SO_3$ ratio can, however, be much higher, i. e., 1.33–100:1, or even greater. A ratio of 1.4–1.6:1 is greatly preferred.

Accordingly it is applicant's invention broadly to react in the vapor phase $NH_3$ and $SO_3$ in an $NH_3:SO_3$ volume ratio of at least 1.33 while diluting one or both reactants with an inert diluent gas such that the volume ratio diluent:$SO_3$ is at least 0.5:1.

The following table shows additional runs, made analogously to the procedure of Example 1 (except as indicated), in which the ratio of $NH_3$, $SO_3$, and inert diluent (air) were varied to produce varying yields of nitrilo.

reaction ports and that the rate of flow of the reactants be reduced to keep the temperature in the reaction zone below 350° C. Thus, as a practical matter there is no advantage in using reactants above room temperature, owing to the consequent reduced yields per unit time. If desired, the reactants can of course be admitted to the reactor at temperatures below room temperature, and can in fact be chilled almost to their liquefaction points before reaction, but the use of low temperatures is a useless expense and accomplishes nothing in the way of increased yields or improved operation.

The invention is most conveniently practiced by introducing the reactants into the reactor at a pressure slightly in excess of atmospheric so that the exit gases will discharge freely to the atmosphere. Obviously any pressure, sub- or super-atmospheric can be used provided the reactants are present in the reactor in the vapor phase. When using subatmospheric pressures it will of course be necessary to pump the exit gases from the reactor, and when using superatmospheric pressures the exit port should preferably consist of any conventional pressure release

| Ex. No. | Materials used, volume (mol) percent | | | Volume (mol) ratio, $NH_3:SO_3$ | Volume (mol) ratio, Air:$SO_3$ | Analysis of product, weight percent | | | |
|---|---|---|---|---|---|---|---|---|---|
| | $NH_3$ | $SO_3$ | Air | | | Nitrilo [1] | Imido [2] | AS [3] | $NH_3$ [4] |
| 3 | 10.0 | 7.2 | 82.8 | 1.4 | 11.5 | 96.3 | 0 | 1.7 | 2.0 |
| 4 | 33.3 | 16.9 | 49.8 | 2.0 | 2.9 | 30.2 | 53.5 | 13.3 | 2.5 |
| 5 | 21.3 | 6.1 | 72.6 | 3.5 | 11.9 | 30.8 | 53.8 | 10.6 | 4.8 |
| 6 | 31.5 | 5.5 | 63.0 | 5.8 | 11.5 | 45.7 | 32.7 | 15.9 | 5.7 |
| 7 | 67.2 | 2.6 | 30.2 | 25.6 | 11.6 | 59.9 | 18.2 | 14.6 | 7.3 |
| X-1 | 21.5 | 6.3 | 72.2 | 3.4 | 11.5 | {[5] 55.4–A, [5] 7.8–B} | 26.9 | 11.4 | 6.3 |
| X-2 | 14.1 | 10.9 | 75.0 | 1.3 | 6.9 | ([6]) | 75.4 | 11.2 | 5.7 |

[1] Anhydrous ammonium nitrilosulfate, $N(SO_3NH_4)_3$.
[2] Diammonium imidodisulfate (also called ammonium imidosulfate).
[3] Ammonium sulfamate.
[4] Adsorbed ammonia.
[5] Mixing was done in a co-flow nozzle, which plugged in 20 minutes. "A" represents product recovered as usual from bottom of reactor and "B" product recovered from bag filter attached to exit vent of reactor (instead of circular filter inside reactor of Fig. 1). "A" and "B" combined had analysis approximately that of Experiment 5.
[6] Gummy product of indeterminate composition.

It is a curious feature of the invention that the purity of the product is greatly influenced by the $NH_3:SO_3$ mol ratio, particularly when said ratio is less than 2. When using an $NH_3:SO_3$ ratio of 1.4–1.6 very pure ammonium nitrilosulfate can be obtained. Strangely enough when this ratio is increased to a figure of 2 or higher the purity of the product immediately drops, but thereafter improves proportionately with greater and greater excesses of $NH_3$ over $SO_3$.

The reaction proceeds under a wide variety of conditions of temperature, pressure, and contact time, and these three factors are to some extent interdependent. At the outset, however, it may be stated that when the reactants are introduced into the reaction vessel at approximately room temperature and approximately atmospheric pressure, good results are obtained regardless of the rate of flow of the gases into the reactor. The reaction is exothermic, and the temperature within the reactor in the immediate proximity of the inlet ports may increase to as much as 200° C. over the initial temperature of the reactants. This temperature increase is immaterial provided the resultant net temperature does not exceed the decomposition point of nitrilo, which is about 350° C. If the reactants are heated before introducing them into the reactor, it is recommended that a thermocouple of any conventional type be inserted between the valve which can be set to open at a predetermined pressure. As stated, the maximum pressure possible is that at which both of the reactants are still in the vapor phase. As sulfur trioxide is more easily liquefied than ammonia, the maximum pressure can be calculated easily by those skilled in the art by reference to the temperature and vapor pressure of the $SO_3$ before it is introduced into the reactor. (Obviously if the $SO_3$ is a vapor prior to the entering the reactor, it will remain a vapor, owing to the increased temperature inside the reactor.) The vapor pressure of the $SO_3$ before entering the reactor is dependent on its temperature and degree of dilution. Permissible maximum pressures at various temperatures are easily determined by inspection of the well known $SO_3$ phase diagram. Obviously the $SO_3$ vapor pressure must never be permitted to rise above the vapor line at a particular temperature, as some of the $SO_3$ will condense to liquid.

The following is illustrative of a procedure for calculating the maximum pressure permissible with $SO_3$ at a given temperature and diluency by use of Dalton's law of partial pressures. Assume that a mixture of 1 volume of $SO_3$ vapor in 9 volumes of air at 20° C. is to be introduced under the maximum permissible pressure. The vapor pressure of $SO_3$ in equilibrium with liquid $SO_3$ at 20° C. is about 200 mm. At atmospheric pressure the pressure of SO₃ in the air mixture chosen would be $$\frac{760}{10} = 76 \text{ mm.}$$

To increase the SO₃ pressure to its liquefaction point at 20° C. it would be necessary to increase the total pressure to $$\frac{200}{76} = 2.64$$

atmospheres. Hence when using such a mixture at 20° C. the mixture could be used at any pressure up to about 2.64 atmospheres. At higher temperatures the pressure can of course be greater. Thus with a 3:1 (volume) air:SO₃ mixture at 98° C., the greatest pressure permissible would be 9.2 atmospheres (vapor pressure of SO₃ at 98° C.) multiplied by its degree of dilution, i. e., 9.2×4=36.8 atmospheres.

It is not essential that the reactant gases be at the same temperature or the same pressure. Nor is it essential that the volume of gases leaving each reaction port be even approximately the same. As will be observed in Example 1, the volume of the SO₃-air mixture is $$\frac{7+82}{11} = 7.9$$

that of the NH₃ volume.

If no diluent gas is added along with the SO₃ vapor, but is instead introduced with the NH₃ vapor, or through an entirely separate conduit, the SO₃ will of course have to be introduced under conditions of temperature and pressure such that it is a vapor. Thus, when introducing it at approximately atmospheric pressure, it should be at a temperature of at least its boiling point, of about 45° C. Higher temperatures and pressures for undiluted SO₃ may be taken directly from its known vapor pressure curve. Thus at 134.5° C. the maximum pressure would be 18.7 atmospheres.

If one or both of the streams of reactants is directed toward a wall of the reaction vessel, some or all of the product adheres to the wall at that point, requiring frequent shut down to scrape the product from the wall. The curious discovery has been made, however, that if the reactant streams are directed counter-currently against each other, the reaction can proceed virtually indefinitely without forming any product on the vessel walls. Accordingly, it is greatly preferred to use apparatus such as that shown in the figure, which will force the reactant gases against each other along the same axis. A further advantage of the counter-current axial flow procedure is that the product is obtained as a fine white powder (actually as very minute globules) easily handled and highly reactive, rather than as cakes of semi-monolithic material that must be broken up before use, as results when the reactant streams are not counter-current on the same axis. However, it will be understood that the invention broadly is not limited to any particular method of admixing the reactants.

The powdery material obtained by the axial counter-current procedure generally contains a few percent of adsorbed ammonia, substantially all of which can be driven off by heating if desired. This adsorbed ammonia, however, is harmless in most of the uses of the nitrilo compound, and actually appears desirable in one of its most important uses, which is the preparation of guanidine sulfate by heating the nitrilo compound with urea or with ammonium thiocyanate, particularly when the guanidine reaction is carried out in an autoclave, as the adsorbed ammonia increases the total nitrogen available to the guanidine system. When using the nitrilo-containing product for making guanidine by either the urea or the ammonium thiocyanate procedure, its nitrilo content is immaterial, and in fact can be very low, e. g., only a few percent, because when it is made in accordance with this invention, its only contaminants are found to be materials similarly efficacious in the guanidine reaction, i. e., diammonium imido disulfate and ammonium sulfamate.

So far as the inventor is aware, the present invention is the only practicable means of preparing an ammonium nitrilo trisulfate suitable for use as a guanidine intermediate. The two hydrated triammonium nitrilo trisulfates known (carrying 1 or 2 molecules of water) are unsuitable for guanidine preparation because their water content tends to hydrolyze the guanidine and/or its intermediates, and in addition the hydrated nitrilos are so expensive to prepare that their commercial use for any known purpose is out of the question. Anhydrous ammonium nitrilosulfate can also be reacted with P₂O₅ to form an excellent flame-proofing compound for use on paper and cloth, whereas the hydrated ammonium nitrilosulfates cannot be so compounded.

As prepared by the procedure of the instant invention, substantially pure anhydrous ammonium nitrilosulfate is in the form of minute crystalline globules fusing with decomposition at approximately 350° C. It differs from diammonium imidodisulfate in that the nitrilo compound hydrolyzes in neutral aqueous solution whereas the imido compound does not. (Nor does ammonium sulfamate.) Ammonium sulfamate is decomposed by aqueous nitrous acid whereas nitrilo is not decomposed. Nitrilo is hydrolyzed in warm to hot acid solution, which property distinguishes it from ammonium sulfamate as the latter compound is not so hydrolyzed.

The drawing shows an apparatus suitable for practicing the invention. Inlet ports 1 and 2 in reaction vessel 3 can be used for NH₃ and SO₃ gases respectively, or the reverse. Excess gases pass through optional filter 4 and can be vented to the atmosphere via outlet 5 or recovered for recycling. The product falls to the bottom of the reaction vessel, where it can be removed by means of a gate valve 6, or the like.

This is a continuation-in-part of the following applications (now abandoned): Serial No. 126,910, filed November 12, 1949; Serial No. 132,500, filed December 12, 1949; Serial No. 166,425, filed June 6, 1950; and Serial No. 170,640, filed June 27, 1950.

While the invention has been described with particular reference to specific embodiments, it is to be understood that it is not to be limited thereto but is to be construed broadly and restricted solely by the scope of the appended claims.

I claim:

1. The method of making anhydrous triammonium nitrilotrisulfate that comprises continuously charging separately into a reaction zone ammonia vapor and sulfur trioxide vapor, at least one of the reactants being charged in admixture with an inert diluent vapor; the volume ratio NH₃:SO₃ being maintained at at least 1.33, and the volume ratio of diluent vapor:$SO_3$ vapor being maintained at at least 0.5; and recovering the thus formed triammonium nitrilotrisulfate.

2. The method according to claim 1 in which the sulfur trioxide is confluently diluted with inert vapor.

3. The method according to claim 2 in which the sulfur trioxide vapor mixture is sulfur trioxide contact converter gas.

4. The method according to claim 3 in which the ammonia:sulfur trioxide mol ratio is approximately 1.4–1.6:1.

5. The method according to claim 1 in which a gaseous stream comprising $NH_3$ is impinged against a gaseous stream comprising $SO_3$, countercurrently along the same axis, whereby substantially free flowing, substantially non-adherent, minute crystalline globues containing anhydrous triammonium nitrilotrisulfate are formed, and recovering the thus formed triammonium nitrolotrisulfate.

6. Anhydrous triammonium nitrilotrisulate, $N(SO_3NH_4)_3$.

NAT H. MARSH.

References Cited in the file of this patent

UNITED STATES PATENTS

| Number | Name | Date |
|---|---|---|
| 1,740,837 | Robson | Dec. 24, 1929 |
| 2,117,626 | Osswald | May 17, 1938 |
| 2,524,341 | Chapman et al. | Oct. 3, 1951 |

FOREIGN PATENTS

| Number | Country | Date |
|---|---|---|
| 562,738 | Germany | Oct. 1932 |

OTHER REFERENCES

J. W. Mellor's "A Comprehensive Treatise on Inorganic and Theoretical Chemistry," vol. 8, pp. 215, 667; vol. 10, pp. 344, 345. Longmans, Green and Co., New York, Publishers.

Lowry's "Inorganic Chemistry," pp. 436, 446; Second Ed. McMillan and Co. Ltd., London.

Journ. of Chem. Soc., Transactions, page 1095, vol. LXXIX, part 2, 1901. Gurney and Jackson, London.